(12) United States Patent
Ono et al.

(10) Patent No.: US 10,769,052 B2
(45) Date of Patent: Sep. 8, 2020

(54) APPLICATION ARRANGEMENT METHOD AND SYSTEM

(71) Applicant: Hitachi, Ltd., Tokyo (JP)

(72) Inventors: Wataru Ono, Tokyo (JP); Keisuke Matsumoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 28 days.

(21) Appl. No.: 16/269,585

(22) Filed: Feb. 7, 2019

(65) Prior Publication Data

US 2019/0370153 A1    Dec. 5, 2019

(30) Foreign Application Priority Data

May 29, 2018    (JP) .................. 2018-102363

(51) Int. Cl.
  *G06F 9/44*        (2018.01)
  *G06F 11/36*       (2006.01)
  *G06F 9/455*       (2018.01)

(52) U.S. Cl.
  CPC .......... *G06F 11/3664* (2013.01); *G06F 9/455* (2013.01)

(58) Field of Classification Search
  CPC ............... G06F 11/3664; G06F 9/455
  See application file for complete search history.

(56) References Cited

U.S. PATENT DOCUMENTS

2011/0265164 A1    10/2011  Lucovsky et al.
2017/0322824 A1*   11/2017  Reuther ............... G06F 3/0632
2018/0307537 A1*   10/2018  Chen ................... G06F 16/128

FOREIGN PATENT DOCUMENTS

JP    2003-022189 A    1/2003
JP     5318903 B2    10/2013

OTHER PUBLICATIONS

Tatsushi et al., Container Management as Emerging Workload for Operating Systems, IEEE, 2016, retrieved online on Apr. 27, 2020, pp. 65-74. Retrieved from the Internet: <URL: https://ieeexplore.ieee.org/stamp/stamp.jsp?tp=&arnumber=7581267>. (Year: 2016).*

* cited by examiner

*Primary Examiner* — Hanh Thi-Minh Bui
(74) *Attorney, Agent, or Firm* — Mattingly & Malur, PC

(57) ABSTRACT

A volume driver is provided in each server that executes a container engine. A first volume driver embeds, in a container image of a container in a first server, a volume ID (which is the ID of a volume, and is according to information acquired from a storage system with respect to the volume) of the volume associated with the container. A second volume driver searches, in the storage system, for a volume to be associated with the container based on the container image, by using the volume ID embedded in the container image outputted from the first server and inputted to the second server.

12 Claims, 12 Drawing Sheets

FIG. 4

VOLUME MANAGEMENT TABLE
371

| No. | MASTER NAA | TARGET NAA | HASH VALUE |
|---|---|---|---|
| 1 | AAAAAAAAAAAAAA | AAAAAAAAAAAAAA | FFFFFFFFFFFFFFFF |
| 2 | AAAAAAAAAAAAAA | BBBBBBBBBBBBBB | YYYYYYYYYYYYYYYY |
| 3 | AAAAAAAAAAAAAA | CCCCCCCCCCCCCC | FFFFFFFFFFFFFFFF |
| 4 | DDDDDDDDDDDDDD | EEEEEEEEEEEEEE | ZZZZZZZZZZZZZZZZ |
| ... | ... | ... | ... |

COPY MANAGEMENT TABLE
351

| COPY PATTERN | Single/Multiple |
|---|---|
| NUMBER OF COPIES | 1-100 |

501, 502

US 10,769,052 B2

APPLICATION ARRANGEMENT METHOD AND SYSTEM

CROSS-REFERENCE TO PRIOR APPLICATION

This application relates to and claims the benefit of priority from Japanese Patent Application number 2018-102363, filed on May 29, 2018 the entire disclosure of which is incorporated herein by reference.

BACKGROUND

The present invention generally relates to arrangement of applications.

Applications (application programs) commonly execute input/output of data. When data inputted/outputted through an application is data to be perpetuated, the data is stored in a volume that is associated with the execution environment of the application.

In general, an application in which a failure has occurred is debugged. Debugging is usually executed in an execution environment (hereinafter, "debugging environment") separated from an execution environment where the application failure has occurred (hereinafter, "production environment").

To construct a physical system as a debugging environment separately from a physical system as a production environment becomes a burden.

Therefore, a virtualization technology may be used for constructing a debugging environment.

The virtualization technology includes hypervisor virtualization and container virtualization. A technology related to hypervisor virtualization is disclosed in PTL1, for example. A technology related to container virtualization is disclosed in PTL2, for example.
[PTL 1] Japanese Patent No. 5318903
[PTL 2] Japanese Patent Laid-Open No. 2003-022189

SUMMARY

Hereinafter, an execution environment according to hypervisor virtualization is referred to as "VM" (VM is an abbreviation for Virtual Machine), and an execution environment according to container virtualization is referred to as "container". It should be noted that PTL1 includes an expression "container VM". The container VM is not a "container" but a "VM" used in the following explanation because the container VM has a guest OS (see FIG. 4).

One of the differences between a VM and a container is whether or not a guest OS (Operating System) is included. Specifically, a VM includes a guest OS while a container does not have a guest OS. Compared to a VM, a container has a lower burden, and enables halting and starting more immediately. For this reason, it is considered that container virtualization is preferably used in debugging applications.

When a container as a debugging environment is started (constructed), the container to be started needs to be associated with a volume associated with a container as a production environment, or a copy volume thereof. Such association needs to be performed manually (for example, cooperation of a container manager and a storage manager is required). The reason for this is that, for the container, the volume is an external device (corresponding to a hardware source, for example), and association for volume management is not performed in an intermediate layer between the container and the volume.

A volume driver is provided in each server that executes a container engine. A first volume provided from a storage system so as to be used in execution of an application is assumed to be associated with a first container that executes the application on a first container engine which is a container engine in a first server. In this case, the first volume driver embeds, in a container image created by imaging the container, a volume ID of the first volume (which is an ID of the volume and is according to information acquired from the storage system with respect to the volume). A second volume driver searches, in the storage system, for a volume to be associated with the container (container of the second server) based on the container image, by using the volume ID embedded in the container image outputted from the first server and inputted into the second server.

It should be noted that the second server is a first server or another server separated from the first server, among the one or more servers. A first volume driver is a volume driver in the first server, among the one or more volume drivers. A second volume driver is a volume driver in the second server, and is a first volume driver or another volume driver separated from the first volume driver, among the one or more volume drivers. The target second container is any one of one or more second containers, and each of the one or more second containers executes the application on the second container engine. A second container engine is the first container engine or another container engine separated from the first container engine, among the one or more container engines.

A volume to be associated with a container based on an inputted container image, is automatically specified so that the volume is associated with the container. As a result, a burden involved with association of a container with a volume is reduced.

BRIEF DESCRIPTION OF THE DRAWINGS

FIG. 4 shows a volume management table;
FIG. 5 shows a copy management table.

DESCRIPTION OF EMBODIMENTS

Figure 1:
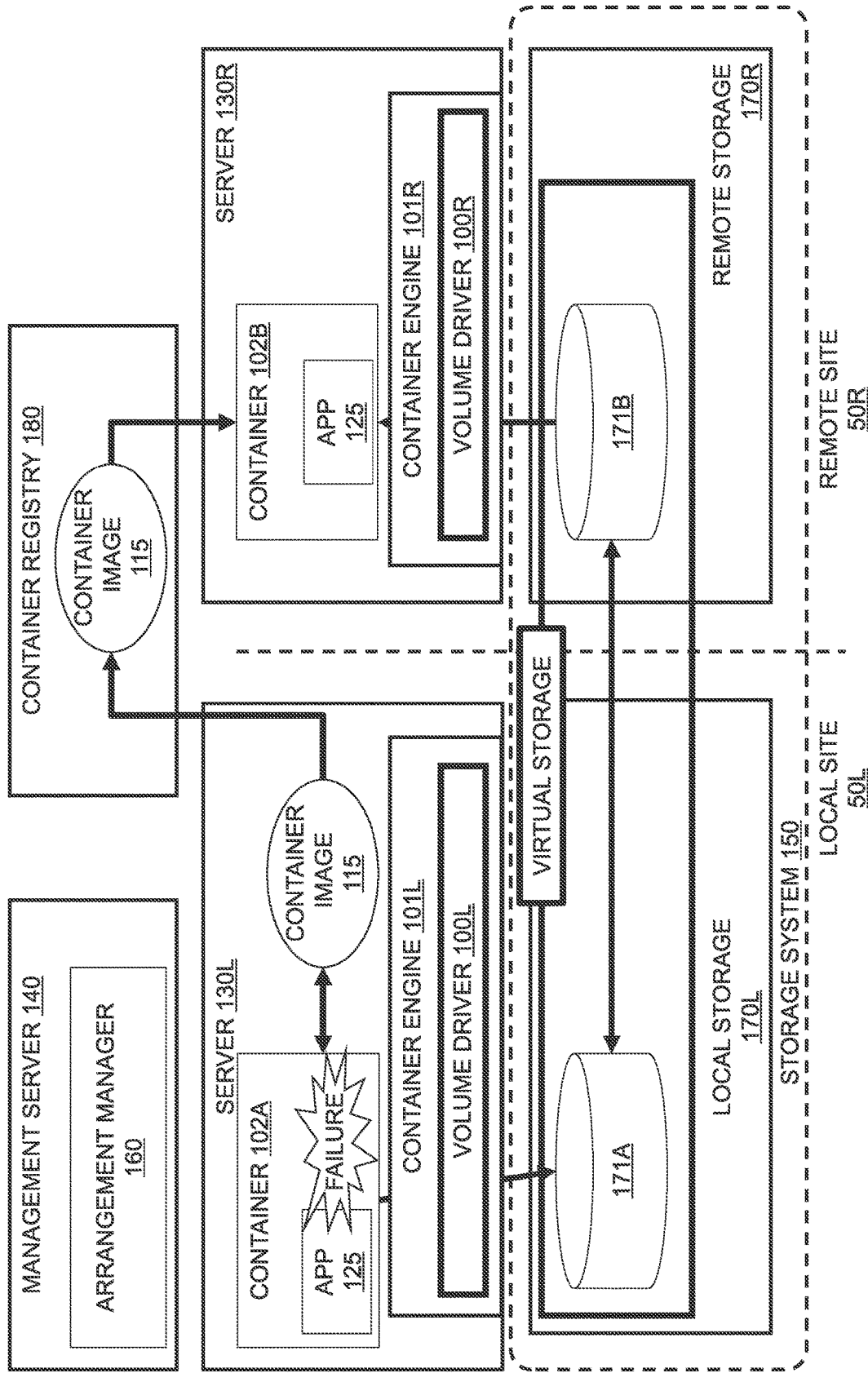
FIG. 1 illustrates the outline of a first embodiment (including the outline of a pattern A)

In the following explanation, an "interface unit" may refer to one or more interfaces. The one or more interfaces may be the same type of one or more communication interfaces (e.g., one or more NICs (Network Interface Cards)), or may be the different types of two or more communication interfaces (e.g., an NIC and an HBA (Host Bus Adapter)).

Further, in the following explanation, a "memory unit" may refer to one or more memories, and may typically refer to a main storage device. At least one of the memories in the memory unit may be a volatile memory, or may be a nonvolatile memory.

Moreover, in the following explanation, a "PDEV unit" may refer to one or more PDEVs, and may typically refer to an auxiliary storage device. The "PDEVs" mean physical storage devices, and may typically refer to nonvolatile storage devices such as HDDs (Hard Disk Drives) or SSDs (Solid State Drives).

Further, in the following explanation, a "storage unit" refers to at least either the memory unit or at least a part of the PDEV unit (typically, at least the memory unit).

Moreover, in the following explanation, a "processor unit" refers to one or more processors. At least one of the processors is typically a microprocessor such as a CPU (Central Processing Unit), but may be another type of a processor such as a GPU (Graphics Processing Unit). The at least one processor may be a single core processor or a multi-core processor. The at least one processor may be a processor in a broad sense, such as a hardware circuit (e.g., an FPGA (Field-Programmable Gate Array) or an ASIC (Application Specific Integrated Circuit)) that executes some processes or all the processes.

Further, in the following explanation, some processes are explained with a "program" as a subject word. However, a program is executed by the processor unit so that a predetermined process is executed with use of a storage unit (e.g., a memory) and/or an interface unit (e.g., a communication port), etc., as appropriate. Therefore, a processor may be used as the subject word of the processes. Processes which are explained with use of a program as a subject word thereof, may be processes which are executed by a processor unit or a device including the processor unit. Also, the processor unit may include a hardware circuit (e.g., an FPGA or an ASIC) that executes some processes or all the processes. The program may be installed from a program source into a device such as a computer. The program source may be a storage medium (e.g., a non-temporal storage medium) that can be read by a program distribution server or a computer. In addition, two or more programs in the following explanation may be implemented as one program, and one program in the following explanation may be implemented as two or more programs.

Moreover, in the following explanation, information for which an output can be obtained in response to an input thereto, may be explained with use of an expression "xxx table". Such information may be data having any structure, or may be a learning model such as a neural network to generate an output in response to an input thereto. For this reason, "xxx table" can be referred to as "xxx information". Further, the configuration of each table in the following explanation is one example. One table may be divided into two or more tables, and the entirety or a part of two or more tables may be one table.

In addition, in the following explanation, in a case where components of the same type are not distinguished from one another, the common reference numeral thereof may be used, and in a case where components of the same type are distinguished from one another, the respective reference numerals thereof may be used. For example, in a case where volume drivers are not distinguished from one another, the term "volume driver 100" is used, and in a case where the volume drivers are distinguished from one another, the terms "volume driver 100L" and "volume driver 100R" are used.

First Embodiment

FIG. 1 illustrates the outline of a first embodiment. It should be noted that the present embodiment includes a local site 50L and a remote site 50R. "L" is added to the end of each reference numeral of specific components in the local site 50L, and "R" is added to the end of each reference numeral of specific components in the remote site 50R. Further, "local" may be added to the head of each name of specific components in the local site 50L, and "remote" may be added to the head of each name of specific components in the remote site 50R. In the present embodiment, two sites, i.e., the local site 50L and the remote site 50R are provided for simplification. However, one site or three or more sites may be provided.

One or more volume drivers 100 are provided which are executed in one or more servers 130 that execute one or more container engines 101. The one or more servers 130 are coupled to a storage system 150 formed of one or more storage devices 170. In the present embodiment, the one or more servers 130 are a local server 130L in the local site 50L and a remote server 130R in the remote site 50R. The one or more container engines 101 are a local container engine 101L that is executed by the local server 130L, and a remote container engine 101R that is executed by the remote server 130R. The one or more volume drivers 100 are a local volume driver 100L that is executed by the local server 130L, and a remote volume driver 100R which is executed by the remote server 130R. The storage system 150 includes, as examples of one or more storage devices, a local storage device 170L (hereinafter, local storage (or storage) 170L), and a remote storage device 170R (hereinafter, remote storage (or storage) 170R). In the example in FIG. 1, the local storage 170L is coupled to the server 130L, and the remote storage 170R is coupled to the server 130R.

A management server 140 is coupled to the servers 130L and 130R (examples of the one or more servers 130). The management server 140 executes an arrangement manager 160.

A container registry 180 is coupled to the servers 130L, 130R, and the management server 140. The container registry 180 may be a server that provides a storage space called a registry (which may be called a repository). A container image is registered in the container registry 180. Registration of a container image in the container registry 180 may be detected as a result of monitoring the management server 140 by means of the arrangement manager 160. However, in the present embodiment, setting to give a notification to the arrangement manager 160 upon a change such as registration of a container image in the container registry 180 is made in advance in the container registry 180. In accordance with the setting, the container registry 180 gives a notification about a change (e.g., registration) to the arrangement manager 160 (a mechanism called Webhook, for example).

At least one of the servers 130, at least one of the storage devices 170, the management server 140, and/or the container registry 180 may be a physical device or a software-defined device (e.g., a software-defined device that is constructed on a computing resource as a cloud base). In addition, in the present embodiment, the volume driver 100 exists in the container engine 101. However, the volume driver 100 may be exist outside the container engine 101 (for example, between a host OS (described later) and the container engine 101 in the server 130).

As illustrated in FIG. 1, the container 102A (one example of a first container) that executes an APP (application program) 125 on the container engine 101L in the local site 50L, is associated with a volume 171A (one example of a first volume) that is used in execution of the APP 125 provided from the local storage 170L. A volume 171B (one example of a second volume) that is a secondary volume for which the volume 171A is a primary volume, is located in the remote storage 170B. That is, the remote storage 170B is a copy of the volume 171.

In the present embodiment, when a specific event such as a failure has occurred in the APP 125, the APP 125 is executed at another container 102B (one example of a second container) in the following manner.

That is, the local volume driver 100L embeds a volume ID of the volume 171A in a container image 115 created by imaging the container 102A. It should be noted that the container image 115 is created by the container engine 101L. In addition, the "volume ID" refers to an ID of the volume 171, according to information which acquired from the storage system 150 (storage devices 170) with respect to the volume 171. In addition, as a specific example of "embedding" the volume ID in the container image 115, the volume ID is written in a meta-region of the container image 115.

The container image 115 is outputted from the local server 130L, and is inputted into the remote server 130R. In the present embodiment, the container image 115 is inputted from the local server 130L to the remote server 130R via the container registry 180.

By using the volume ID embedded in the container image 115 inputted to the server 130R, the remote volume driver 100R searches, in the storage system 150 (in the present embodiment, the remote storage 170R coupled to the server 130R), for the volume 171 that is associated with the container 102B based on the inputted container image 115. As a result, the volume 171B is found, and therefore, the container engine 101R starts the container 102B in a state where the container 102B is associated with the found volume 171B.

As described above, the volume 171B to be associated with the container 102B based on the inputted container image 115 is automatically specified so that the volume 171B is associated with the container 102B. Specifically, the "volume ID" according to the present embodiment corresponds to information about hardware external to the container 102. Such a volume ID corresponding to hardware information is embedded in a container image so that a volume to be associated with a container based on the container image can be found with use of the volume ID embedded in the container image. As a result, a burden involved with association of the volume 171B with the container 102B is reduced.

It should be noted that, a various type of an ID capable of identifying the volume 171 can be used as the "volume ID", but the volume ID in the present embodiment is an NAA. NAA is an abbreviation for Name Address Authority, and is an ID unique to a vendor, an ID based on the production number of the storage device 170, or an ID based on the identification number of the volume 171, that is, an ID capable of uniquely identifying the volume 171. An NAA is an ID (a standard of an SCSI (Small Computer System Interface) defined by IEEE (The Institute of Electrical and Electronics Engineers, Inc.)) ordinarily provided to the storage device 170. When an NAA is used as a volume ID, a system which has high versatility without depending on a storage vendor and which is easily installed, can be expected to be developed. It should be noted that, regarding the volume ID, an "ID according to information acquired from the storage system 150 (storage device 170) with respect to the volume 171" may be information itself acquired from the storage device 170, or may be information calculated by the server 130 (for example, the volume driver 100) on the basis of the information acquired from the storage device 170. Hereinafter, the NAA is used as the volume ID. An NAA is one example of a global ID (an ID that at least does not overlap with another one in the storage system 150) in the storage system 150.

In the present embodiment, an NAA is embedded in the container image 115, and the container image 115 having the NAA embedded therein is inputted/outputted. As a result, input/output of the container image 115 can involve transmission/reception of the NAA.

Moreover, in the present embodiment, output (push) and input (pull) of the container image 115 among the servers 130 is carried out via the container registry 180, and the management server 140 (the arrangement manager 160) is prepared. In response to registration of the container image 115 in the container registry 180 from the server 130L, a notification is automatically transmitted to the arrangement manager 160. In response to the notification, the arrangement manager 160 automatically transmits, to the server 130R, a command to pull the container image 115. In response to the pull command, the server 130R (the volume driver 100R, for example) automatically inputs (pulls) the container image 115 from the container registry 180. That is, a process from output of the container image 115 to input thereof to the server 130R can be automated. Accordingly, a burden involved with association of the volume 171B with the container 102B can be expected to be further reduced. In addition, since the container image 115 is registered in the container registry 180, the container image 115 can be distributed to a plurality of environments and a plurality of containers 102 including the container 102B (pattern C (described later)) can be started. It should be noted that when two or more servers 130 exist, a transmission destination of a pull command may be selected by the arrangement manager 160 in accordance with a predetermined policy. Further, instead of input/output via the container registry 180, distribution of a container image in a binary format (tar.gz, etc.) may be adopted for input/output of the container image 115.

Further, in the present embodiment, the volume 171 to be associated with the container 102B based on the container image 115 inputted to the remote server 130R is the volume 171B as a copy of the primary volume 171A (the volumes 171A and 171B are paired). Accordingly, a change of original data due to the APP 125 executed in the container 102B, can be avoided.

Moreover, in the present embodiment, the volume ID is an NAA which is one example of a global ID. Therefore, the NAA of the volume 171B is normally different from the NAA of the volume 171A. Therefore, in the present embodiment, the volume 171B can be found by any one of methods (A) and (B) below:

(A) Virtual storage setting: Specifically, the volume driver 100L performs virtual storage setting of setting the volume 171A and the volume 171B to be one virtual storage. Accordingly, an NAA identical to the NAA of the volume 171A is associated with the volume 171B. As a result, by searching using the NAA embedded in the container image 115, the volume 171B linked to the NAA identical to the NAA of the volume 171A, can be found. The method (A) is performed in a pattern A (described below); or (B) Combination of an NAA and volume data information: Specifically, the volume driver 100L embeds, in the container image 115, volume data information which is information acquired from the storage device 170L with respect to data stored in the volume 171, and the NAA of the volume 171A (writes the volume data information and the NAA in a meta-region of the container image 115). The volume driver 100R searches, in the storage system 150, for the volume 171 to be associated with the container 102B, by using the NAA and the volume data information embedded in the container image 115 inputted to the server 130R. As a result, the volume 171B that is linked to the identical volume data information and that is linked to the NAA of the volume 171A as the NAA of a copy source, is found. The volume data information is information about data stored in the volume 171, and corresponds to hardware information, similar to the NAA. According to the method (B), the volume data information as well as the NAA is embedded so that, even when the NAA of the volume 171A is different from that of the volume 171B, the volume 171B which is a copy of the volume 171A can be found. A hash value of data stored in the volume 171 may be used as the volume data information. However, in the present embodiment, the volume data information is a hash value of data of the difference between data stored in the volume 171 as a snapshot volume and data stored in an original volume of the volume 171 (the starting volume of a snapshot volume). The method (B) is performed in patterns B and C (described later). However, the method (B) may be adopted in the pattern A that does not include virtual storage setting.

Hereinafter, the present embodiment will be described in detail.

Figure 2:
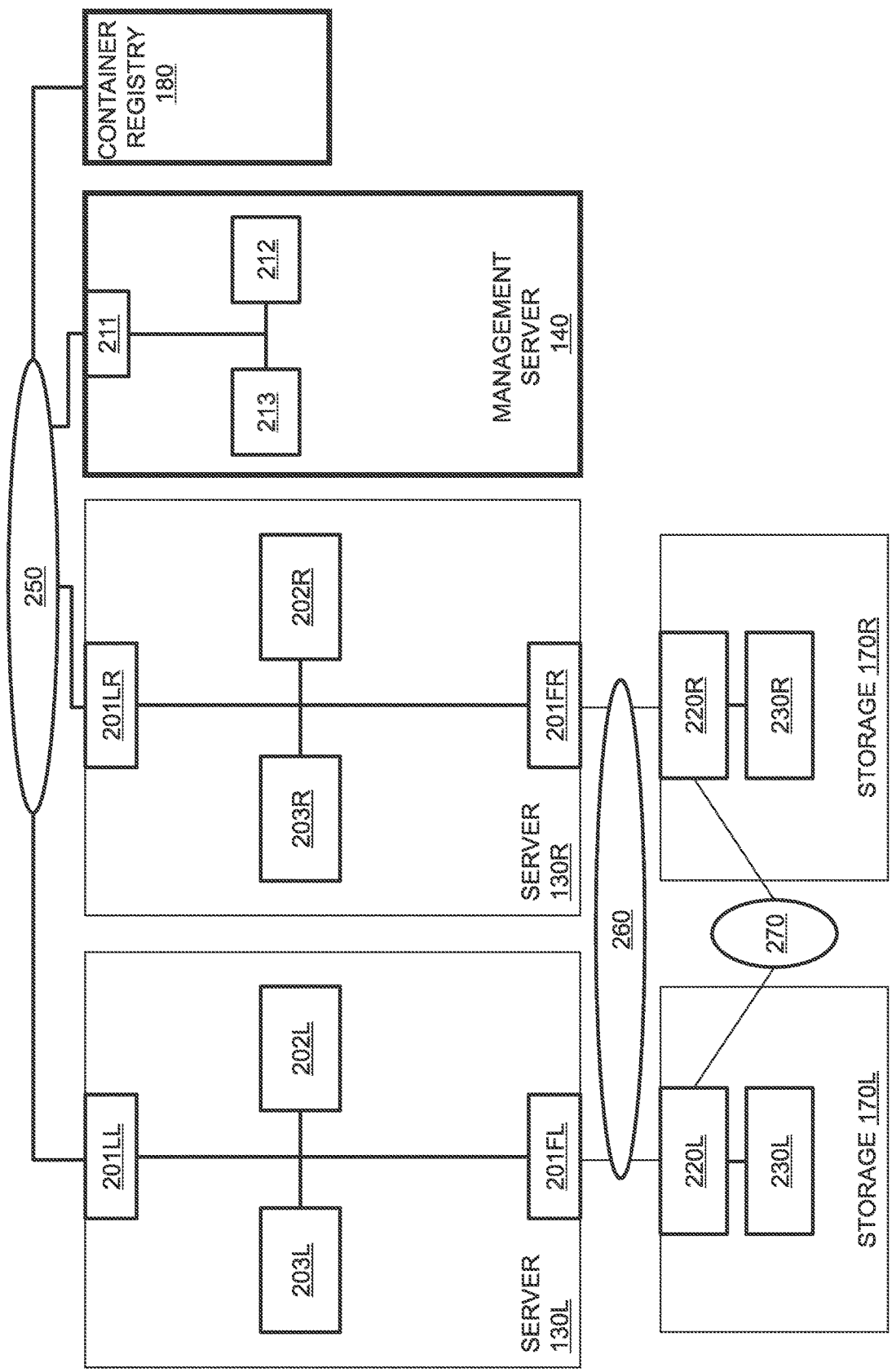
FIG. 2 illustrates the physical configuration of an entire system according to the first embodiment.

FIG. 2 illustrates the physical configuration of the entire system according to the present embodiment.

The servers 130L and 130R, the management server 140, and the container registry 180 are coupled to a LAN (Local Area Network) 250 which is one example of a first network. The server 130L, the storage 170L, the server 130R, and the storage 170R are coupled to an FC (Fibre Channel) network 260 which is one example of a second network. The storages 170L and 170R are coupled to an FC network 270 which is one example of a third network. The FC network 260 is one example of a front-end network of the storages 170L and 170R. The FC network 270 is one example of a back-end network of the storages 170L and 170R. Two or more of the first to third networks may be integrated. As the networks, other types of networks such as WAN (Wide Area Network) may be used.

The servers 130 each include an interface unit, a storage unit 202, and a processor unit 203 coupled to the interface unit and the storage unit 202. The interface unit includes a LAN interface 201L which is coupled to the LAN 250, and an FC interface 201F which is coupled to the FC network 260.

The storages 170 each include a PDEV unit 230 and a storage controller 220 coupled to the PDEV unit 230. The storage controller 220 is coupled to the FC networks 260 and 270. The storage controller 220 includes an interface unit, a memory unit, and a processor unit which is coupled to the interface unit and the memory unit (not illustrated). The storage controller 220 receives an I/O (Input/Output) request outputted from the server 130 in accordance with execution of the APP 125. In response to the I/O request, the storage controller 220 performs I/O to/from the volume 171. Data to be written in the volume 171, is written in a physical storage region (a storage region of the PDEV unit 230) associated with a logical storage region in the volume 171.

The management server 140 includes a LAN interface 211 (one example of the interface unit) which is coupled to the LAN 250, a storage unit 212, and a processor unit 213 which is coupled to the LAN interface 211 and the storage unit 212.

Figure 3:
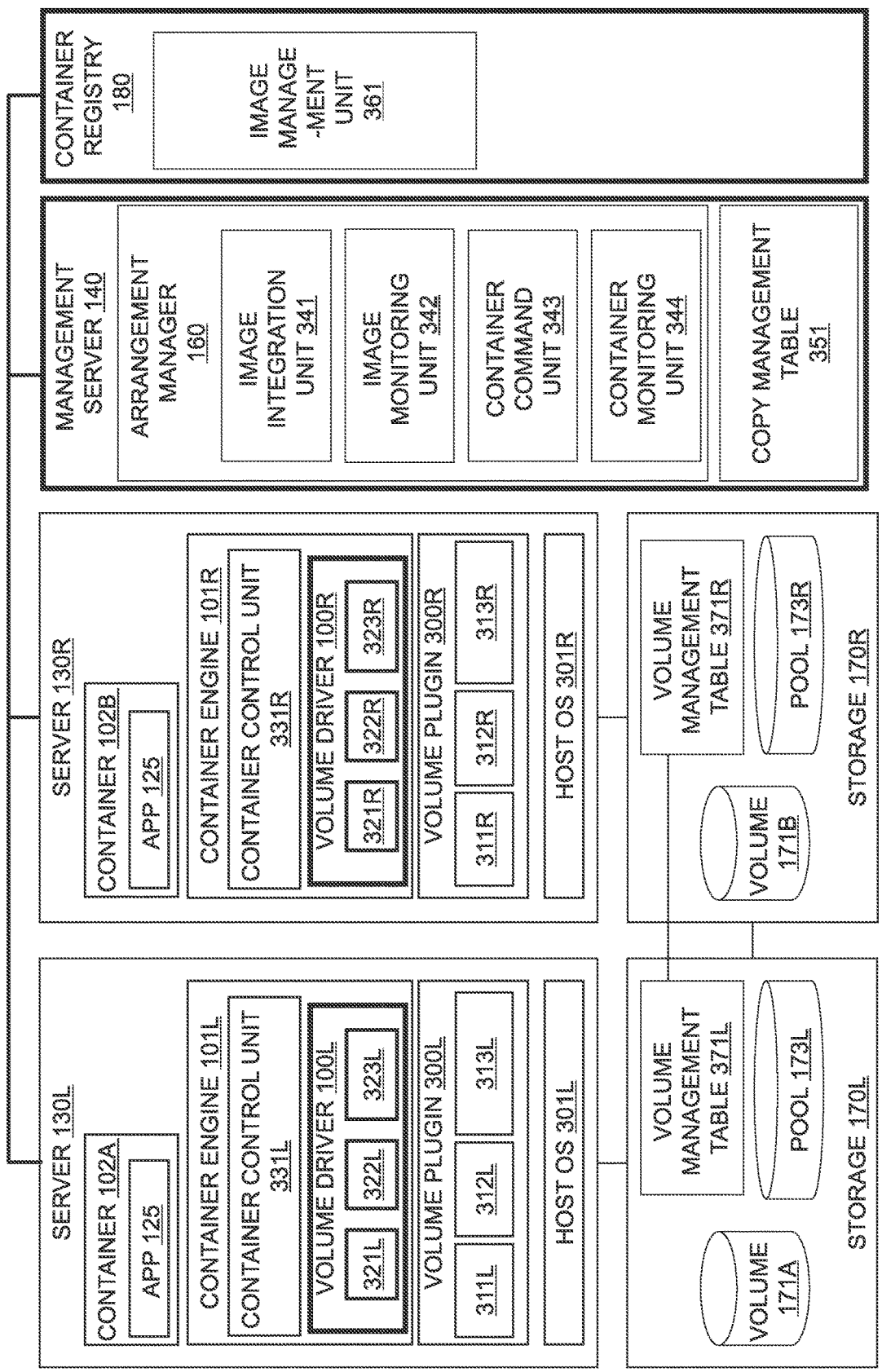
FIG. 3 illustrates the logical configuration of the entire system according to the first embodiment.

FIG. 3 shows the logical configuration of the entire system according to the present embodiment.

In the server 130, programs such as the container engine 101, the volume driver 100, a volume plugin 300, and a host OS 301 are stored in the storage unit 202, and these programs are executed by the processor unit 203.

The volume plugin 300 performs volume control of performing virtual storage setting in response to a virtual storage setting command. For example, the volume plugin 300 has a volume copying unit 311, a volume association unit 312, and a volume provisioning unit 313. The volume copying unit 311 transmits, to the storage 170, a command to create a secondary volume to the volume 171 as a primary volume. In response to the command, the volume 171B which is a copy of the volume 171A is created, for example. The volume association unit 312 associates the volume 171 provided from the storage 170, with the container 102. The volume provisioning unit 313 performs virtual storage setting in response to the virtual storage setting command.

The container engine 101 has a container control unit 331 and the volume driver 100. The container control unit 331 starts the container 102, creates the container image 115 of the container 102, and the like.

The volume driver 100 has an ID giving unit 321, an ID comparison unit 322, and a table update unit 323. The ID giving unit 321 acquires the NAA (and the hash value (one example of volume data information)) of the volume 171 having been recognized by the container 102, and embeds the acquired NAA (and the hash value) in the container image 115. At the time of start of the container 102, the ID comparison unit 322 compares the NAA (and the hash value) in the container image 115 with the volume management table 371 (that is, searches for the volume 171 by using the NAA (and the hash value)). When the corresponding volume 171 is found, the ID comparison unit 322 instructs the volume plugin 300 to perform association of the volume 171. In a state where the container 102 to be started is associated with the volume 171 in response to the instruction, the container 102 is started. The table update unit 323 updates the volume management table 371 in the storage 170.

The storage 170 provides a volume 171. In addition, the storage 170 includes a pool 173 and a volume management table 371. Data (data with respect to a snapshot volume (described later), for example) as the difference between volumes 171 is stored in the pool 173. The pool 173 may include a pool having storage regions to be dynamically allocated to volumes 171, when the volumes 171 are volumes according to Thin Provisioning, for example. The volume management table 371 may be stored in a memory unit of the storage controller 220, or may be stored in a certain volume 171. The details of the volume management table 371 will be described later. In the present embodiment, the volume management table 371 the details of which are the same are held in all the storages 170. In other words, the volume management tables 371 are synchronized among the storages 170.

The arrangement manager 160 has an image integration unit 341, an image monitoring unit 342, a container command unit 343, and a container monitoring unit 344. Also, the management server 140 (e.g., storage unit 212) stores a copy management table 351. The image integration unit 341 integrates two or more container images into one container image. The image monitoring unit 342 receives a notification transmitted in response to registration of a container image in the container registry 180. In response to the notification, the image monitoring unit 342 reports reception of the notification to the container command unit 343. In response to the notification, the container command unit 343 transmits, to the container engine 101, a command to start the container 102. The container monitoring unit 344 monitors the container 102. As a result, when a failure has occurred in the APP 125 in the container 102, the failure can be detected by the container monitoring unit 344. The copy management table 351 is a table for defining a process (pattern B, pattern C, or a pattern other than the patterns B and C) to follow execution of the pattern A. The patterns A to C will be described later.

The container registry 180 has an image management unit 361. The image management unit 361 transmits a notification in response to a change in the container registry 180.

FIG. 4 shows the volume management table 371.

The volume management table 371 holds information about the volume 171 in the storage 170 that has the table 371. Specifically, the volume management table 371 has an entry for each volume 171, for example. Information such as No. 401, a master NAA 402, an own NAA 403, and a hash value 404 is stored in each entry. Hereinafter, a certain volume 171 ("target volume 171" in explanation of FIG. 4) will be described as an example.

No. 401 indicates an entry number. The master NAA 402 indicates the NAA of a copy source volume of the target volume 171. The own NAA 403 indicates the NAA of the target volume 171. The hash value 404 indicates a hash value of data of the difference between data stored in the target volume 171 and the data stored in an original volume thereof. When the target volume 171 has no copy source volume, the hash value 404 is a value ("FFFF . . . ") indicative of the absence of a difference. In addition, when the target volume 171 has a copy source volume since the target volume 171 is a snapshot volume (an N-th generation snapshot volume (N is a natural number)) and the copy source volume is the original volume of the snapshot volume, the hash value 404 at the time of creation of the target volume 171 is a value ("FFFF . . . ") indicative of the absence of a difference. On the other hand, when the target volume 171 is a snapshot volume and the copy source volume is another snapshot volume, the hash value 404 at the time of creation of the target volume 171 is a hash value identical to the hash value 404 corresponding to the copy source volume. When the container image 115 of the container 102 associated with the target volume 171 is created, a hash value identical to the hash value 404 corresponding to the target volume 171 is embedded in the container image 115. It should be noted that, in the present embodiment, the "data of the difference" linked to the target volume 171 is (1) of (1) and (2) below, but (2) may be adopted instead of (1).
(1) All data stored in a pool 173 with respect to the target volume 171 (including latest updated data about all storage regions (e.g., all blocks) constituting the target volume 171, and all data before update, for example).
(2) The latest updated data, of all the data stored in the pool 173 with respect to the target volume 171, about all the storage regions constituting the target volume 171.

In the entry, a various type of information such as the ID of the storage 170 having the copy source volume of the target volume 171 and the ID of the storage 170 having the target volume 171 may be stored. It should be noted that, in the present embodiment, the volume ID is the NAA, and the NAA includes the production number, etc. of the storage 170 having the volume 171. Thus, which storage 170 the volume 171 exists in can be discerned from the NAA.

FIG. 5 shows the copy management table 351.

The copy management table 351 is a table for defining a process (the pattern B, the pattern C, or a pattern other than the patterns B and C) to follow execution of the pattern A. Specifically, a copy pattern 501 and a copy number 502 are stored in the copy management table 351, for example.

The copy pattern 501 indicates the type of processes to follow execution of the pattern A. "Single" means the pattern B. "Multiple" means the pattern C. "–" means a pattern excluding the patterns B and C.

The copy number 502 is a value effective for a case where processes to follow execution of the pattern A is the pattern C, and indicates the number of volumes to be created as secondary volumes. It should be noted the copy number 502 may be a value also effective for a case where processes to follow execution of the pattern A is the pattern B. In this case, the copy number 502 may indicate the number of volumes to be created as secondary volumes after execution of the pattern A.

Hereinafter, the pattern A to the pattern C will be described. In the following explanation, according to which pattern of the patterns A to C is performed, a hash value as well as the own NAA is embedded or is not embedded in the container image. Alternatively, a hash value as well as the own NAA may be embedded in the container image, irrespective of the patterns A to C. Further, the master NAA may also be embedded in the container image.

Pattern A

FIG. 1 shows the outline of the pattern A.

That is, in the pattern A, virtual storage setting is performed on the volume 171B of the volume 171A. Accordingly, an NAA identical to the NAA of the volume 171A is associated with the volume 171B. Consequently, the volume 171B can be found as a result of searching using, as a key, the NAA of the volume 171A embedded in the container image 115.

Figure 6:
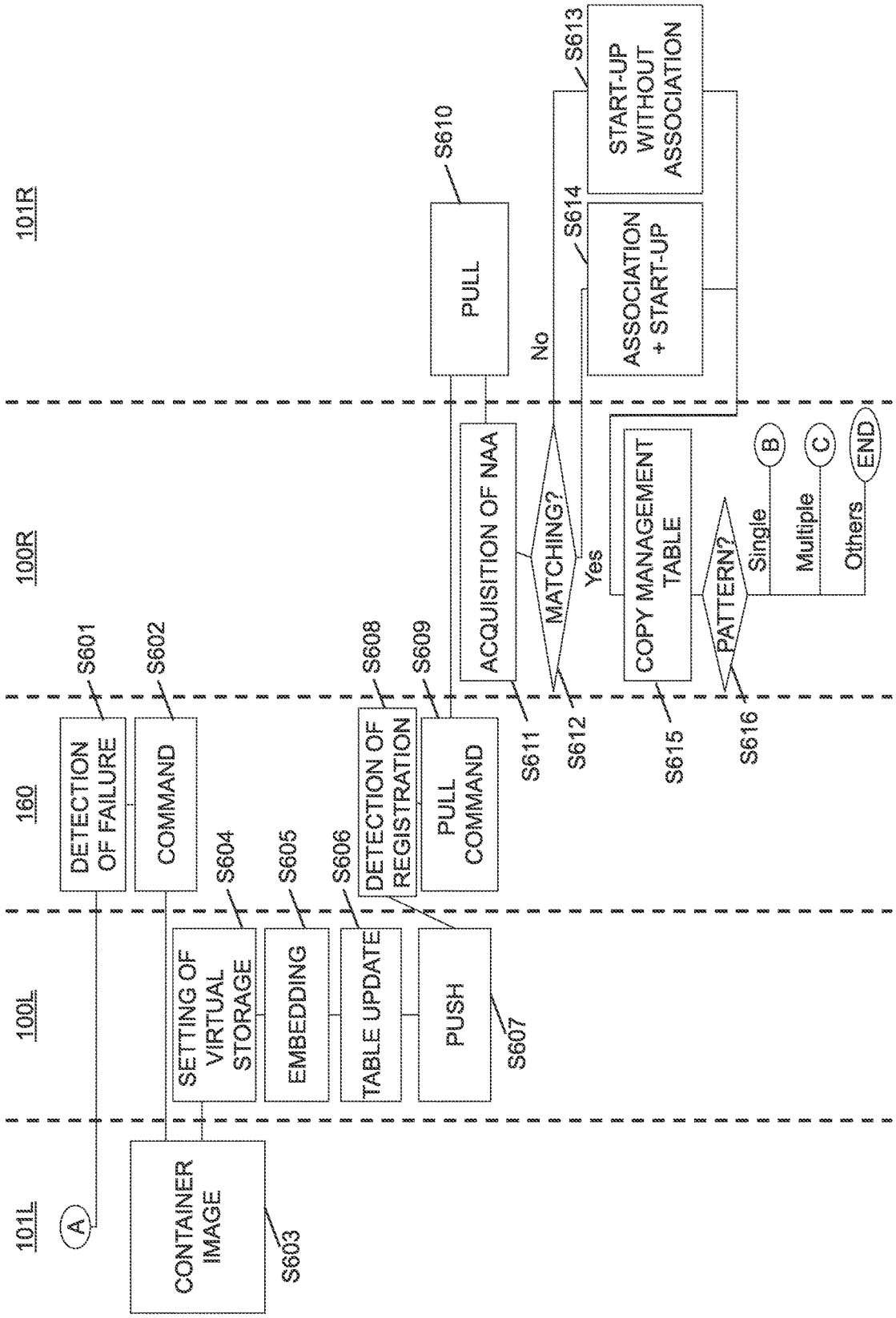
FIG. 6 shows detection of a failure, and processes (processes according to the pattern A) that are executed in response to detection of the failure.

FIG. 6 shows detection of a failure, and processes (processes according to the pattern A) in response to detection of the failure.

The container monitoring unit 344 detects a failure in the APP 125 in the container 102A by monitoring the container 102A (S601). In response to detection of the failure, the container command unit 343 transmits, to the container engine 101L, an image creation command to create the container image 115 of the container 102A (S602).

In response to the image creation command, the container control unit 331 of the container engine 101L images the container 102A, that is, creates a container image of the container 102A (S603).

Thereafter, the volume driver 100L gives, to the volume plugin 300L, a virtual storage setting command for the volume 171A associated with the container 102 and the volume 171B paired with the volume 171A (S604). In response to the command, the volume provisioning unit 313 of the volume plugin 300L transmits, to the storage 170L, a request to perform virtual storage setting on the volumes 171A and 171B. In response to the request, virtual storage setting is performed on the volumes 171A and 171B. For example, in response to the request, the storage 170L gives the same virtual volume number to the volumes 171A and 171B such that the volumes 171A and 171B belong to the virtual storage. As a result, the NAAs of the volumes 171A and 171B are identical to each other. It should be noted that the identical NAAs of the volumes 171A and 171B are registered in the volume management table 371L, and are registered also in the volume management table 371R through synchronization of the volume management tables 371. However, in the volume management table 371R, the own NAA 403 is the NAA of the volume 171B, and the master NAA 402 is the NAA of the volume 171A. It should be noted that virtual storage setting may be preliminarily performed prior to creation of the container image 115. Also, upon receiving the virtual storage setting command from the volume driver 100L, the volume copying unit 311 may transmit, to the storage 170L, a request to create a copy volume of the volume 171A, prior to transmission of the virtual storage setting request to the storage 170L. In response to the request, the volume 171B as a copy of the volume 171A may be created in the storage 170R. Thereafter, virtual storage setting may be performed on the volume 171A and the volume 171B.

The volume driver 100L inquires the storage 170R about the NAA of the volume 171A (or information necessary for calculation of the NAA), and receives the NAA of the volume 171A (or information necessary for calculation of the NAA) as a reply (this process may be preliminarily done (e.g., at a time of association of the volume 171A)). The volume driver 100L embeds the NAA (own NAA) of the volume 171A in the container image 115 created in S603 (S605).

When the volume 171B (a copy volume of the volume 171A) is created in S604, the volume driver 100L updates the volume management table 371L (S606). Specifically, the volume driver 100L registers a value ("FFFF . . . ") indicative of the absence of a difference, as the hash value 404 in an entry (an entry having, as the NAA 403, the NAA of the volume 171B) that corresponds to the volume 171B in the volume management table 371L. The reason why a value ("FFFF . . . ") indicative of the absence of a difference is registered as the hash value 404 is that the volume 171B has no difference from the volume 171A at the time of creation of the volume 171B. In synchronization of the volume management table 371, the hash value 404 is reflected in the entry corresponding to the volume 171B in the volume management table 371R. It should be noted that, when the volume 171B is preliminarily provided, S606 may be at least partially skipped.

The volume driver 100L pushes (outputs) the container image 115 having the NAA of the volume 171A embedded therein, to the container registry 180 (S607).

The image monitoring unit 342 of the arrangement manager 160 detects that the container image 115 has been registered in the container registry 180 (S608). Specifically, a notification outputted from the container registry 180 in response to registration of the container image 115 in the container registry 180, is received by the image monitoring unit 342 of the arrangement manager 160.

The image monitoring unit 342 reports registration of the container image 115 to the container command unit 343. The container command unit 343 transmits a command to pull the container image 115 (which may be also used as a command to start a container) to the container engine 101R of the server 130R (S609). It should be noted that, the reason why the pull command is transmitted to the server 130R may be that the storage 170R is specified as a copy destination of the volume 171A or may be that the arrangement manager 160 preliminarily discerns that the storage 170R will be a copy destination of the volume 171 in the storage 170L, for example.

In response to the pull command, the container engine 101R pulls (inputs) the container image 115 from the container registry 180 (S610).

The volume driver 100R acquires the NAA in the inputted container image 115 (S611). Subsequently, the volume driver 100R determines whether or not the volume management table 371R includes an own NAA 403 that matches the NAA (S612).

When the determination result in S612 is negative (S612: No), the container engine 101R starts the container 102B based on the inputted container image 115 without association with the volume 171 (S613).

On the other hand, when the determination result in S612 is affirmative (S612: Yes), the container engine 101R starts the container 102B in the state where the volume 171B corresponding to the matching own NAA 403 is associated with the container 102B based on the inputted container image 115 (S614).

After S613 or S614, the volume driver 100R reads the copy management table 351 from the arrangement manager 160 (S615). The volume driver 100R refers to the copy pattern 501 in the copy management table 351 (S616). When the copy pattern 501 is "single", the processes of the pattern B are performed. When the copy pattern 501 is "multiple", the processes of the pattern C are performed. When the copy pattern 501 is "–", the process is ended.

Pattern B

Figure 7:
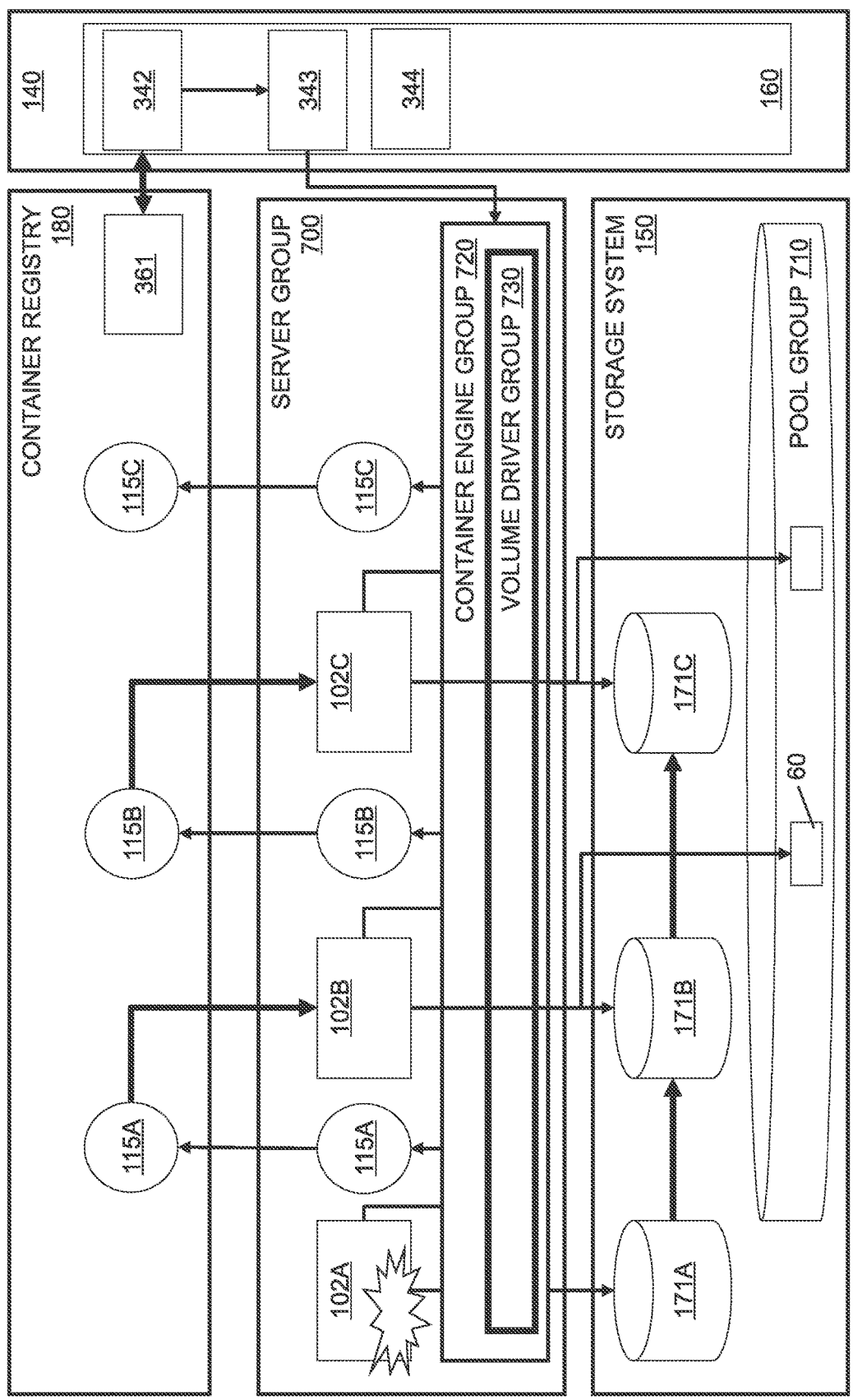
FIG. 7 illustrates the outline of a pattern B.

FIG. 7 shows the outline of the pattern B. It should be noted that a server group 700 includes one or more servers 130. A container engine group 720 includes one or more container engines 101. A volume driver group 730 includes one or more volume drivers 100. A pool group 710 includes one or more pools 173. That is, a plurality of containers 102 may exist in one server 130, or may exist in a plurality of servers 130.

In the pattern B, creation of the container image 115 of the container 102 and start of the container 102 based on the created container image 115 are sequentially repeated. Specifically, in the pattern B, (x1) and (x2) below are sequentially performed one or more times. The volume driver 100 in the first (x1) is the volume driver 100L or another volume driver 100 (100R, for example). The volume driver 100 in the second or later (x1) is the volume driver 100 in the last (x2). It should be noted that the number of times of performing a pair of (x1) and (x2) may be specified for each APP 125 or for each type of the APP 125, etc.

(x1) The volume driver 100 embeds, in the container image 115 of the container 102, a hash value (a hash value acquired from the storage system 150) indicated by the hash value 404 corresponding to the volume 171 associated with the container 102 and the NAA (own NAA) of the volume 171.

(x2) The volume driver 100 searches, in the storage 170 (volume management table 371), for the volume 171 to be associated with the container 102 in the server 130 having the volume driver 100, with use of the NAA and the hash value embedded, in (x1), in the container image 115 inputted to the server 130.

In FIG. 7, data 60 is assumed to be stored in the volume 171B (specifically, the data 60 is stored in the pool group 710). In this case, difference data of the volume 171B from the volume 171A is the data 60. When a difference is generated between the volume 171B and the original volume 171A (which is also a copy source volume), the hash value 404 corresponding to the volume 171B is updated. In addition, the volume 171C is created as a secondary volume of the volume 171B. The hash value 404 concerning the volume 171C is a value identical to the hash value 404 of the volume 171B. When the container image 115B of the container 102B associated with the volume 171B is created in (x1), the NAA (own NAA) of the volume 171B and a hash value identical to the updated hash value 404 are embedded in the container image 115B. When virtual storage setting has been performed on the volumes 171A and 171B, the NAA of the volume 171B is identical to the NAA of the volume 171A. When virtual storage setting has not been performed on the volumes 171A and 171B, the NAA of the volume 171B is different from the NAA of the volume 171A. In (x2), the volume 171 to be associated with the container 102C based on the container image 115B is searched for with use of the NAA and the hash value embedded in the container image 115B. Here, the volume 171C which is linked to a hash value matching the embedded hash value and the master NAA 402 of which is the NAA of the volume 171B, is found. Consequently, the volume 171C is associated with the container 102C based on the container image 115B.

The pattern B is effective for a case where succession by teams is necessary in debugging of the APP 125, for example. It is assumed that two bugs (hereinafter, bugs P, Q) are detected during development of the APP 125, for example. It is assumed that the bug Q depends on the bug P, and the APP 125 cannot be corrected and acknowledgement of the correction thereof cannot be obtained unless the bug P is solved. In this case, a team X having created the bug P corrects the bug P, and, after acknowledgement of the correction is obtained, the container 102B is imaged in order to save the corrected state. Thereafter, this environment is taken over by a team Y having created the bug Q (the container 102C based on the container image 115B is started), so that correction can be performed and acknowledgement of the correction can be obtained.

Figure 8:
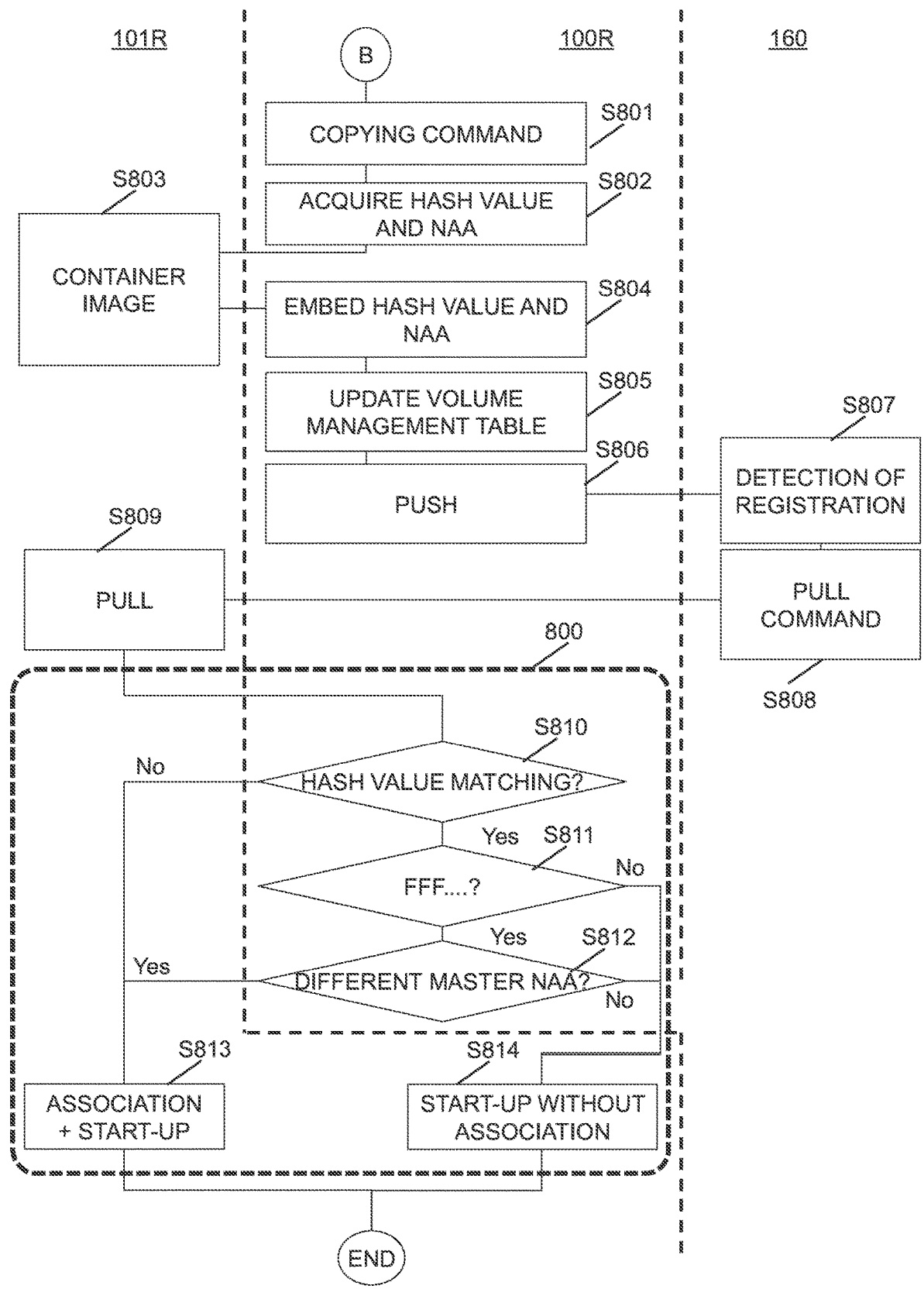
FIG. 8 shows specific processes in processes according to the pattern B.

FIG. 8 shows processes related to the aforementioned (x1) and (x2) which are performed one time in the processes according to the pattern B. In FIG. 8, the volume driver 100 is the volume driver 100R.

The volume driver 100R gives a copy command to the volume plugin 300R (S801). The copy command herein refers to a command to create a copy volume of the volume 171B associated with the container 102B. In response to the command, the volume copying unit 311R of the volume plugin 300R transmits, to the storage 170R, a request to create a copy volume of the volume 171B. In response to the request, the volume 171C as a copy volume of the volume 171B is created in the storage 170R. The volume 171C may be created in another storage 170, instead of the storage 170R. When the snapshot generation of the volume 171B is defined as n, the snapshot generation of the volume 171C is (n+1).

The volume driver 100R acquires, from the storage 170R, the NAA of the volume 171B and the hash value (an NAA and a hash value matching the own NAA 403 corresponding to the volume 171B and the hash value 404) (S802).

The container engine 101R creates the container image 115B of the container 102B (S803). The volume driver 100R embeds the acquired NAA and hash value in the container image 115B created in S803 (S804).

The volume driver 100R updates the volume management table 371R (S805). Specifically, the volume driver 100R registers the NAA of the volume 171B as the master NAA 402, the NAA of the volume 171C as the own NAA 403, and a value, as the hash value 404, matching the hash value 404 corresponding to the volume 171B, in an entry corresponding to the volume 171C in the volume management table 371R.

The volume driver 100R pushes (outputs), to the container registry 180, the container image 115B having the NAA of the volume 171B and the hash value embedded therein (S806).

The image monitoring unit 342 of the arrangement manager 160 detects that the container image 115B has been registered in the container registry 180 (S807). The image monitoring unit 342 reports registration of the container image 115 to the container command unit 343, and the container command unit 343 transmits a command to pull the container image 115 to the container engine 101R of the server 130R (S808). In response to the pull command, the container engine 101R pulls (inputs) the container image 115B from the container registry 180 (S809).

The volume driver 100R determines whether or not the hash value 404 that matches the hash value embedded in the container image 115B, exists in the volume management table 371R (S810).

When the determination result in S810 is affirmative (S810: Yes), the volume driver 100R determines whether or not the hash value is a value "FFFF . . . " indicative of the absence of a difference (S811).

When the determination result in S811 is affirmative (S811: Yes), the volume driver 100R determines whether or not the NAA embedded in the container image 115B differs from the master NAA 402 corresponding to the matching hash value 404 (S812).

When the determination result in S810 is negative (S810: No) or when the determination result in S812 is affirmative (S812: Yes), the container engine 101R starts the container 102C based on the inputted container image 115B without association with the volume 171 (S813).

When the determination result in S811 is negative (S811: No) or when the determination result in S812 is negative (S812: No), the container engine 101R starts the container 102C in the state where the volume 171C corresponding to the hash value is associated with the container 102C based on the inputted container image 115B (S814).

According to the range denoted by reference numeral 800, the volume 171 in the storage 170R to be associated with the container 102C applies to a volume (a) or (b) among the one or more volumes 171 in the storage 170R:

(a) The volume 171 associated with the hash value 404 that matches the hash value embedded in the container image 115B, and that means the presence of a difference; or (b) The volume 171 associated with the hash value 404 that matches the hash value embedded in the container image 115B and that means the absence of a difference, but the volume 171 corresponds to the master NAA 402 (the NAA of the primary (copy source) volume) that matches the NAA embedded in the container image 115B.

Regarding the pattern B, it should be noted that, in accordance with execution of the APP 125 in the container 102B after start of the container 102B, the volume 171B associated with the container 102B may be updated, or, in accordance with execution of the APP 125 in the container 102C after S813 or S814, the volume 171 (the volume 171C or another volume 171, for example) associated with the container 102C may be updated.

Pattern C

Figure 9:
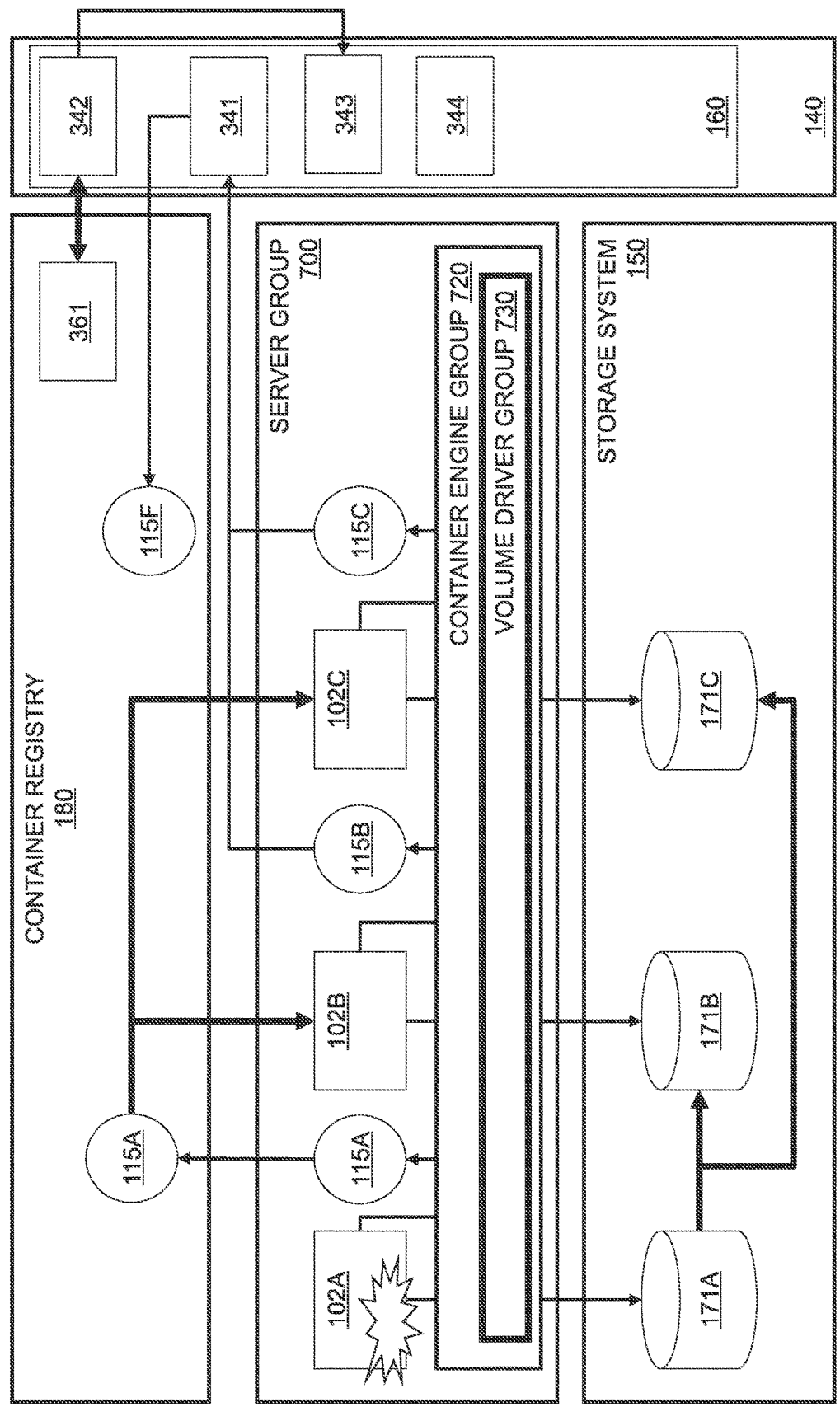
FIG. 9 illustrates the outline of a pattern C.

FIG. 9 shows the outline of the pattern C.

In the pattern C, two or more volumes 171 secondary to one primary volume 171 are created, and the container 102 based on the inputted container image 115 is started for each of the two or more secondary volumes 171. Specifically, in the pattern C, (y1) and (y2) below are performed. The volume driver 100 in (y1) is the volume driver 100L or 100R (or another volume driver 100). Any one of the volume drivers 100 in (y2) is the volume driver 100R (or another volume driver 100).

(y1) The volume driver 100 embeds, in the container image 115 of the container 102, a hash value indicated by the hash value 404 corresponding to the volume 171 associated with the container 102 and the NAA of the volume 171.

(y2) The respective volume drivers 100 related to the two or more secondary volumes 171 searches, in the storage system 150, for the volume 171 to be associated with the container 102 of the server 130 having the volume driver 100, with use of the NAA and the hash value embedded, in (y1), in the container image inputted to the server 130.

According to the example in FIG. 9, in the pattern C, the plurality of containers 102B and 102C obtained by copying the container image 115A (a container image of the container 102A) as a golden image can be simultaneously analyzed by a plurality of people during debugging of the APP 125, for example. The volumes 171B and 171C (snapshot volumes of the volume 171A) to be associated with the containers 102B and 102C, respectively, can be found in (y2) with use of the NAA and the hash value embedded, in (y1), in the container image 115A. The container image 115B of the container 102B and the container image 115C of the container 102C are integrated by the image integration unit 341 of the arrangement manager 160, and as a result, one container image (integrated container image) 115F is created.

It should be noted that, the pattern C follows the pattern A in FIG. 6, but the pattern C may be performed without the pattern A, as illustrated in FIG. 9. Hereinafter, an explanation is given for FIG. 10 in which the pattern C is performed without the pattern A for simplification. Similarly, it should be noted that the pattern B may be performed without the pattern A. Alternatively, the patterns B and C may be combined.

Figure 10:
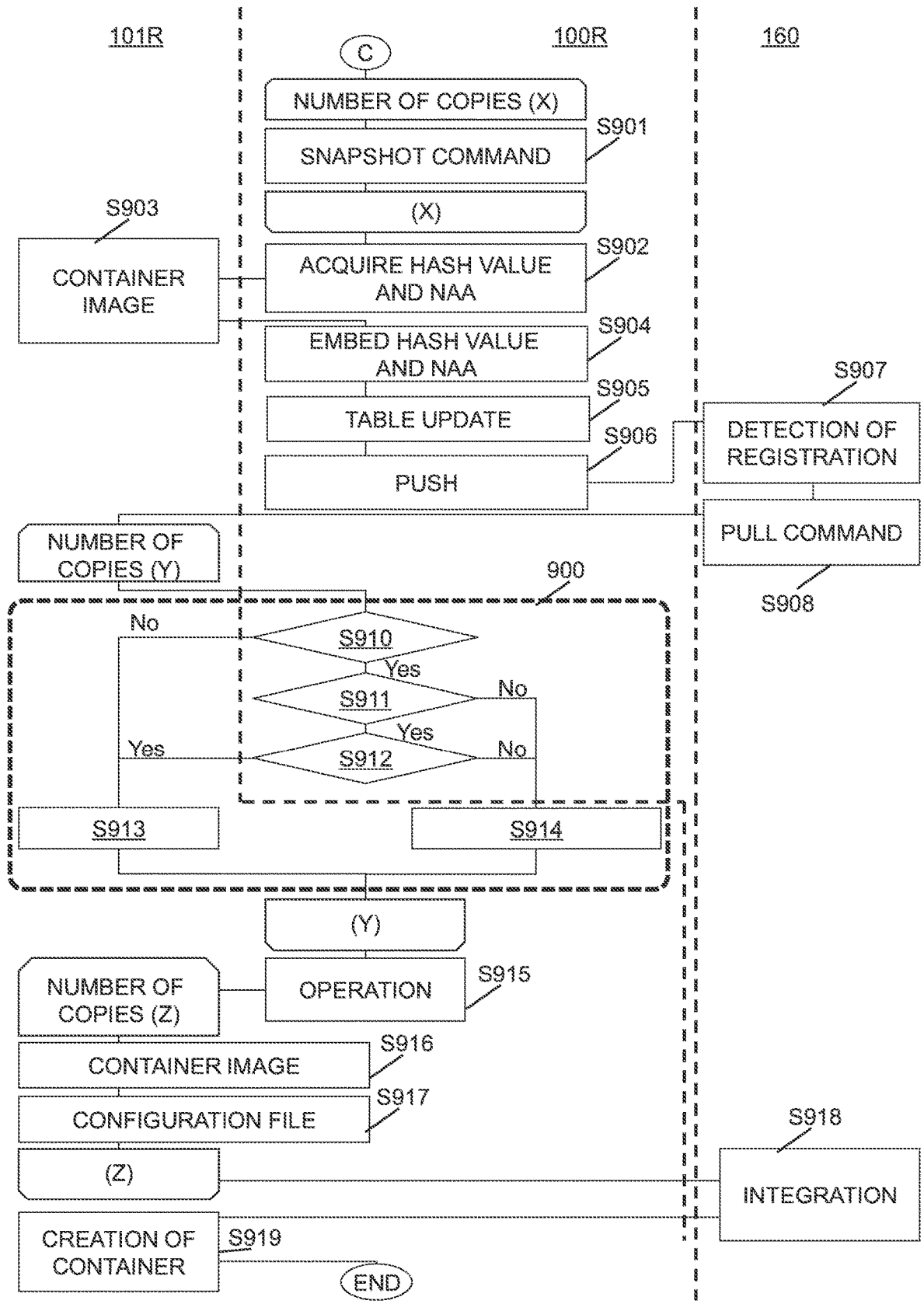
FIG. 10 shows processes according to the pattern C.

FIG. 10 shows processes according to the pattern C. In FIG. 10, the volume driver 100 is the volume driver 100L. In the explanation for FIG. 10, the copy number 502 (see FIG. 5) is set to "2".

The volume driver 100L gives, to the volume plugin 300L, a snapshot command to create snapshot volumes (snapshot volumes of volume 171A) 171B and 171C the number (i.e., two) of which is equal to the copy number 502 which is "2" (S901). In response to the snapshot command, the snapshot volumes 171B and 171C of the volume 171A are created in the storage 170L by the volume copying unit 311 of the volume plugin 300L. It should be noted that one snapshot volume 171 may be created in response to one snapshot command (in this case, snapshot commands the number of which is equal to the copy number 502 are outputted), or the snapshot volumes 171B and 171C the number of which is equal to the copy number 502 may be created in response to one snapshot command. Also, some of the snapshot volumes 171B and 171C the number of which is equal to the copy number 502 may be created in another storage 170 separated from the storage 170L.

The volume driver 100L acquires the NAA of the volume 171A and the hash value (an NAA and a hash value identical to the own NAA 403 and the hash value 404 corresponding to the volume 171A) from the storage 170L (S902).

The container engine 101L creates a container image 115A of the container 102A (S903). The volume driver 100L embeds the acquired NAA and the hash value in the container image 115A created in S903 (S904).

The volume driver 100L updates the volume management table 371L (S905). Specifically, the volume driver 100L adds entries for respective snapshot volumes 171 in the volume management table 371L, registers, as the own NAAs 403 in the corresponding added entries, the NAAs of the snapshot volumes 171 corresponding thereto, registers the NAA of the volume 171A as the master NAA 402, and registers, as the hash value 404, a value (an initial value "FFFF . . . " at this time point) indicative of the difference from the volume 171A.

The volume driver 100L pushes (outputs), to the container registry 180, the container image 115A having the NAA of the volume 171A and the hash value embedded therein (S906).

The image monitoring unit 342 of the arrangement manager 160 detects that the container image 115A has been registered in the container registry 180 (S907). The image monitoring unit 342 reports registration of the container image 115A to the container command unit 343, and the container command unit 343 transmits a command to pull the container image 115A to the container engine 101L of the server 130L (S908). In response to the pull command, the container engine 101L pulls (inputs) the container image 115A from the container registry 180 (S909).

Processes denoted by reference numeral 900, that is, processes S910 to S914 identical to the processes S810 to S814 in FIG. 8 are performed the number of times equal to the copy number 502. As a result, the containers (containers based on the inputted container image 115A) 102B and 102C the number of which is equal to the copy number 502, are started. The container 102B is associated with the snapshot volume 171B, and the container 102C is associated with the snapshot volume 171C. It should be noted that, in the processes denoted by reference numeral 900, two snapshot volumes 171 having the same master NAA 402 and the same hash value 404 are found for one container 102 between the containers 102B and 102C. Here, one snapshot volume 171 is arbitrarily selected (one scheme related to this point will be described later in a second embodiment).

Operation (specifically, correction of the APP 125, for example) is performed for each of the containers 102 started in the processes denoted by reference numeral 900 (S915).

Figure 11:
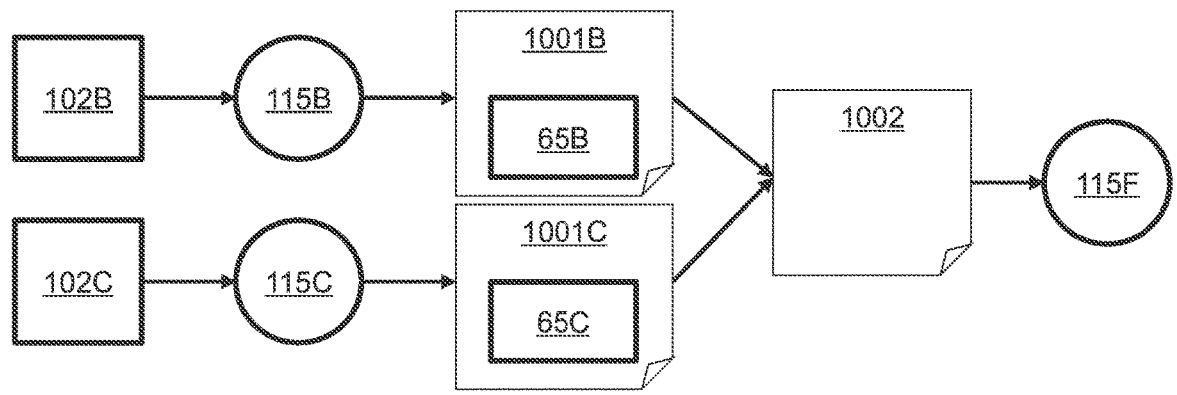
FIG. 11 shows the outline of one example of integrating container images.

Next, integration is performed. Here, an explanation thereof will be given with reference to FIG. 11, as appropriate. The container engine 101L creates container images 115B and 115C of the containers 102 for the containers 102B and 102C started in the processes denoted by reference numeral 900 (S916), and creates configuration files 1001B and 1001C of the container images 115B and 115C (S917). The configuration file 1001B includes difference data (e.g., data related to correction of the APP 125) 65B of the container 102B from the container 102A. Similarly, the configuration file 1001C includes difference data 65C of the container 102C from the container 102A. The container engine 101L transmits the configuration files 1001B and 1001C to the arrangement manager 160. The image integration unit 341 of the arrangement manager 160 creates an integrated file 1002 by integrating the configuration files 1001B and 1001C, and creates a container image (integrated container image) 115F from the integrated file 1002 (S918).

The integrated container image 115F is transmitted from the arrangement manager 160 to the container engine 101L. The container engine 101L starts the container 102 based on the integrated container image 115F (S919).

The explanation of the first embodiment has been given above. It should be noted that a secondary volume created in the pattern B may be a snapshot volume. Also, a secondary volume created in the pattern C may be a copy volume of a copy source volume, instead of a snapshot volume.

Second Embodiment

A second embodiment will be described. Here, the difference from the first embodiment will be mainly described, and an explanation of features the same as those of the first embodiment is omitted or simplified.

In the second embodiment, the distance between the server 130 and the storage 170 is managed. When two or more corresponding volumes 171 are found in volume searching using the NAA (and the hash value), one of the volumes 171 is selected on the basis of the distance between the server 130 and the storage 170.

Figure 12:
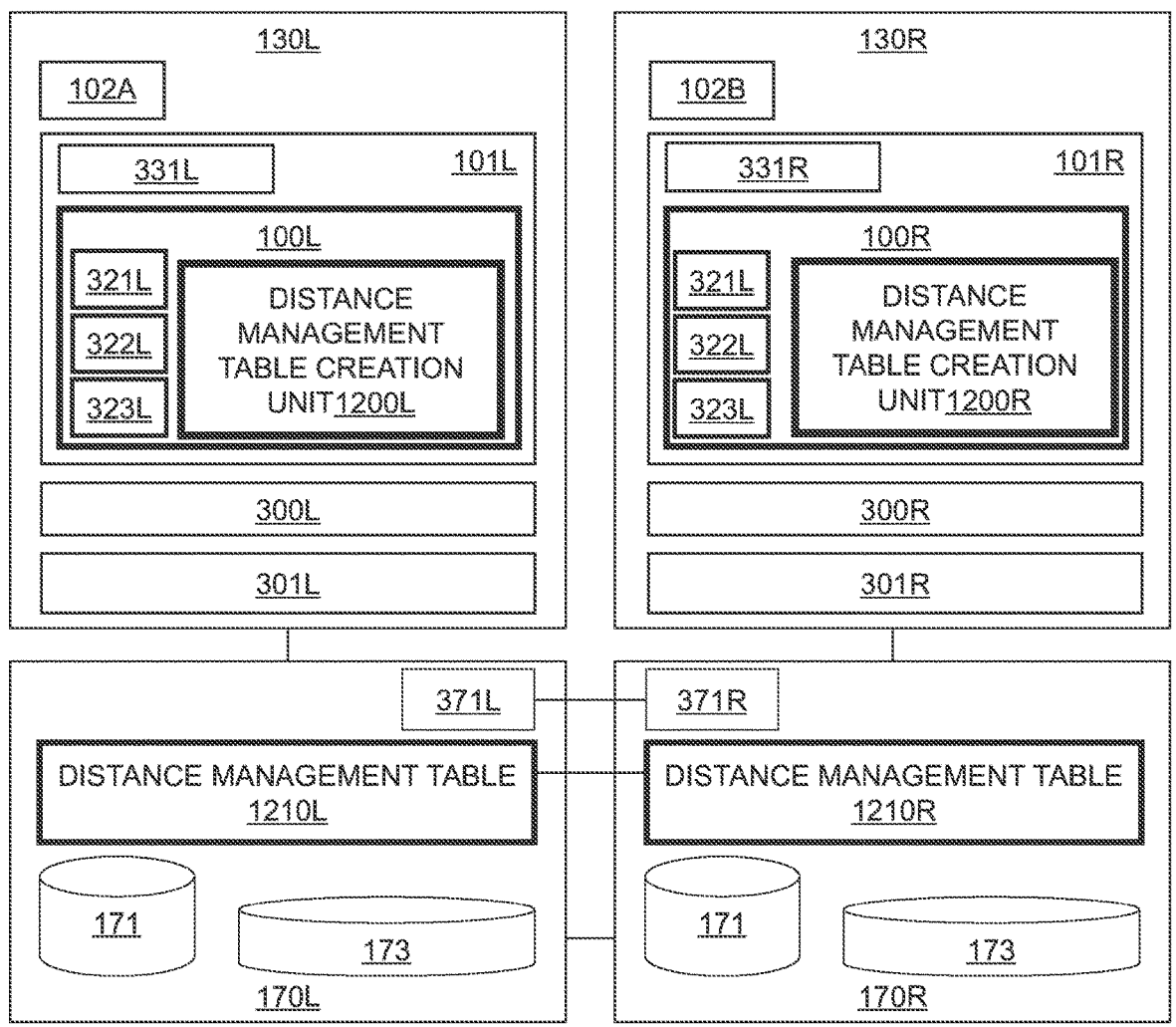
FIG. 12 illustrates the logical configuration of servers and storages according to a second embodiment.

FIG. 12 shows the logical configuration of the server 130 and the storage 170 according to the second embodiment.

In the server 130, the volume driver 100 has a distance management table creation unit 1200. The distance management table creation unit 1200 creates a distance management table 1210 in the storage 170. The distance management table 1210 may be created in the server 130 instead of the storage 170, or may be created additionally in the server 130.

Figure 13:
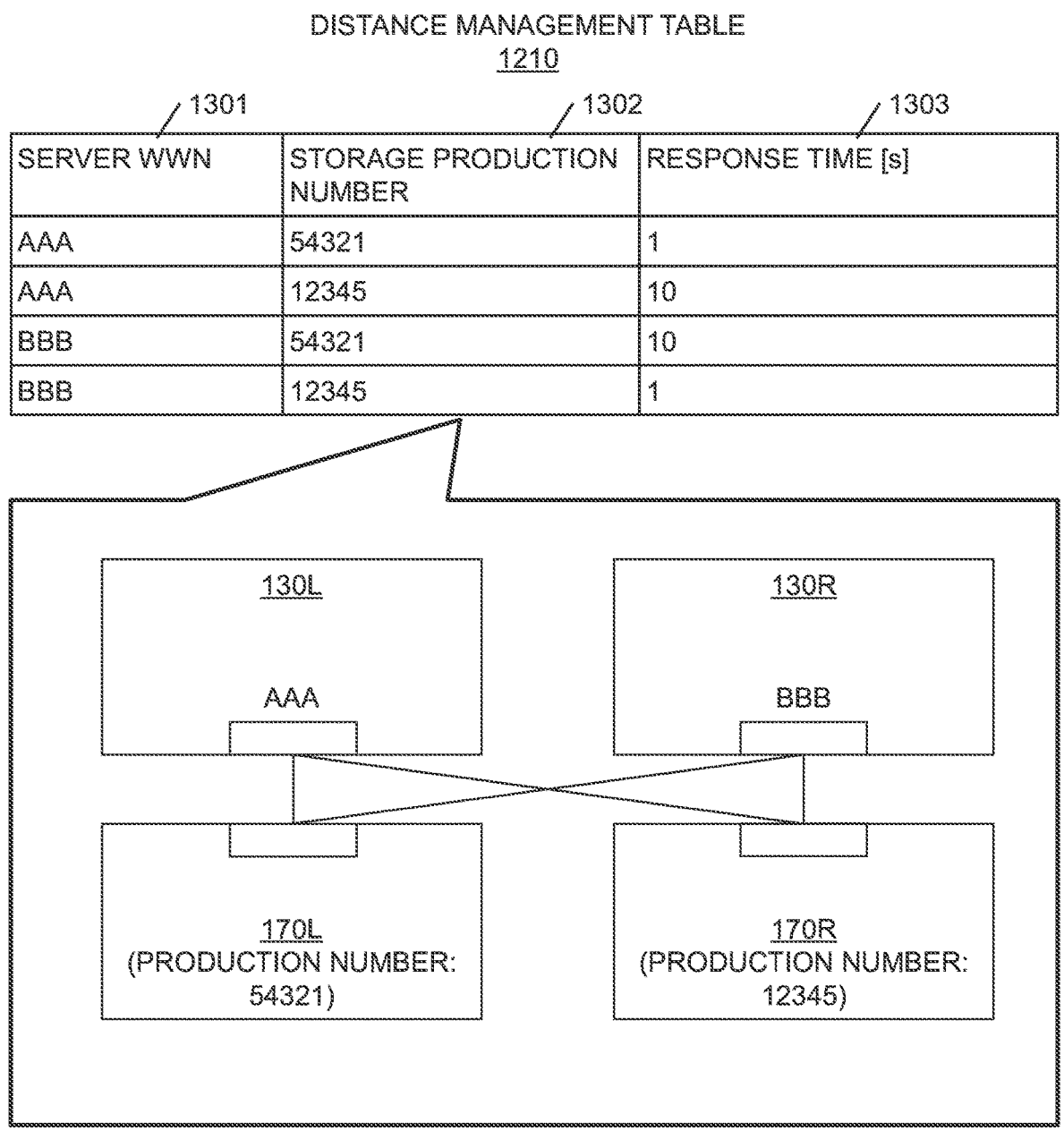
FIG. 13 shows a distance management table.

FIG. 13 shows the distance management table 1210. It should be noted that, in the example in FIG. 13, the servers 130L and 130R are each coupled to both the storages 170L and 170R.

The distance management table 1210 holds information indicative of the distance between the server 130 and the storage 170. Specifically, for example, the distance management table 1210 has an entry for each pair of the server 130 and the storage 170 coupled to each other. Information such as a server WWN 1301, a storage production number 1302, and a response time 1303 is stored in each entry.

The server WWN 1301 indicates the WWN (World Wide Name) of the server 130. The storage production number 1302 indicates the production number of the storage 170. The response time 1303 indicates a response time that is taken for a response to be received after transmission of information from the server 130 to the storage 170. When the value of the response time 1303 is less, the distance is shorter. The response time can be acquired by an fcping command, for example. Alternatively, in order to express the distance, an expression excluding the response time may be used.

Figure 14:
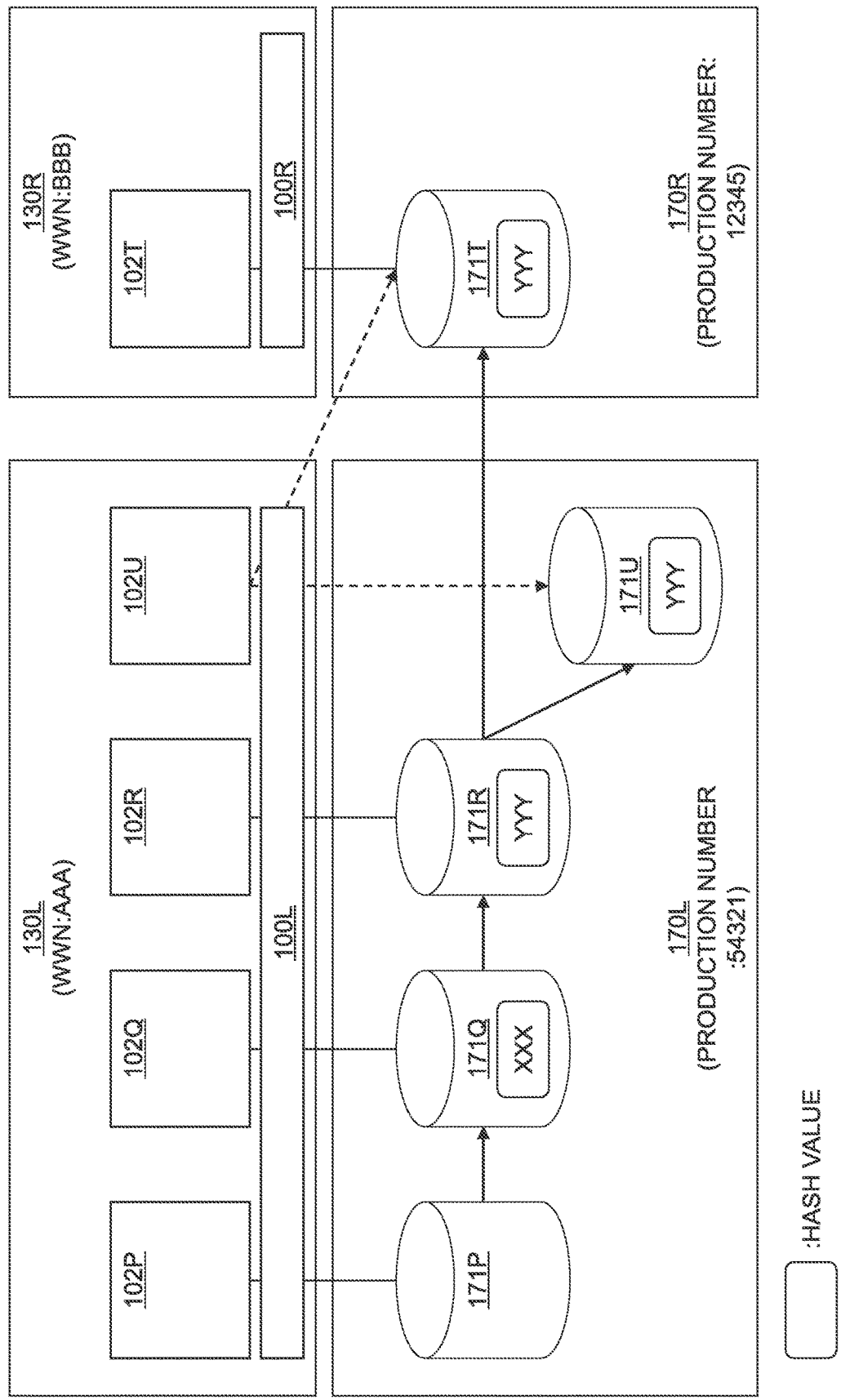
FIG. 14 illustrates one example of volume selection.

FIG. 14 is a schematic diagram showing one example of selection of a volume.

The example in FIG. 14 is as follows. A volume 171P is associated with a container 102P. Subsequently, in accordance with the pattern B, a volume 171Q which is a secondary volume to the volume 171P, and a volume 171R which is a secondary volume to the volume 171Q are sequentially created. Similarly, a container 102Q is started on the basis of a container image of the container 102P, and a container 102R is created on the basis of a container image of the container 102Q. The volume 171Q is associated with the container 102Q. The volume 171R is associated with the container 102R.

Thereafter, in accordance with pattern C, the volume 171U secondary to the volume 171R is assumed to be created in the local storage 170L, and a volume 171T secondary to the volume 171R is assumed to be created in the remote storage 170T (the hash values 404 corresponding to the volumes 171U and 171T are each identical to the hash value 404 "YY" of the volume 171R). In addition, the container 102U based on the container image of the container 102R is assumed to be started in the local server 130L, and the container 102T based on the container image of the container 102R is assumed to be started in the remote server 130R. Specifically, prior to the container 102T, the container 102U is assumed to be started.

In this case, the volume driver 100L founds the volumes 171U and 171T in volume searching (in (y2) above, for example), because the NAA of the volume 171R and the hash value "YYY" corresponding to the volume 171R are embedded in the container image of the container 102, and the volumes 171U and 171T are hit in searching using the hash value "YYY" (unlike "FFF", "YYY" is a hash value indicative of the presence of a difference). Therefore, the volume driver 100L selects, as the volume 171 to be associated with the container 102U in the local server 130L, the volume 171U, between the found volumes 171U and 171T, that exists in the storage 170L closest to the local server 130L where the volume driver 100L exists, on the basis of the distance management table 1210L. Specifically, the volume driver 100L acquires, for each of the found volumes 171U and 171T, the storage production number (the NAA includes the storage production number) from the own NAA 403 corresponding to the volume 171. The volume driver 100L acquires, for each acquired storage production numbers, a response time from the distance management table 1210L by using the storage production number as a key. The volume driver 100L selects, between the volumes 171U and 171T, the volume 171U that is associated with the storage production number corresponding to the shortest one among acquired response times. The selected volume 171U is associated with the container 102U. Accordingly, the I/O performance of the APP 125 to be executed in the started container 102U can be expected to be made optimal.

Some embodiments of the present invention have been explained above. However, these embodiments are examples for explanation of the present invention, and are not intended to limit the scope of the present invention to these embodiments. The present invention can be implemented by other various embodiments.

For example, the "container" may be replaced with "VM" (virtual machine) in the aforementioned explanation. A VM has virtual hardware and a guest OS to be executed on the virtual hardware, but, similarly to the container, does not have hardware source information (e.g., the ID of a Law device) such as an NAA of a volume outside the VM. Accordingly, an expression below can be given, for example. A volume driver is provided to each server that executes an engine (e.g., a hypervisor or a container engine) of an execution environment (e.g., a container or a VM). A first volume provided from a storage system so as to be used in execution of an application, is assumed to be associated with an execution environment where the application is executed on a first engine which is an engine in a first server. In this case, the first volume driver embeds the volume ID (which is an ID of a volume, and is according to information acquired with respect to the volume from the storage system) of the first volume in an execution environment image created by imaging the execution environment. A second volume driver searches, in the storage system, for a volume to be associated with an execution environment (an execution environment in the second server) based on the execution environment image outputted from the first server and inputted to a second server, by using the volume ID embedded in the execution environment image.

What is claimed is:

1. An application arrangement system comprising:
one or more volume drivers that are executed in one or more servers that execute one or more container engines, wherein
a first volume that is provided from a storage system including one or more storage devices and that is used in execution of an application, is associated with a first container that executes the application on a first container engine which is a container engine in a first server,
a first volume driver embeds a volume ID of the first volume in a container image created by imaging of the first container, and the volume ID is the ID of a volume and an ID according to information acquired from the storage system with respect to the volume,
a second volume driver searches, in the storage system, for a volume to be associated with a target second container among one or more second containers, by using the volume ID embedded in the container image outputted from the first server and inputted into the second server,
the second server is the first server or another server among the one or more servers separated from the first server,
the first volume driver is a volume driver in the first server, among the one or more volume drivers,
the second volume driver is a volume driver in the second server, and is the first volume driver or another volume driver separated from the first volume driver, among the one or more volume drivers,
each of the one or more second containers is a container that executes the application on a second container engine,
the second container engine is the first container engine or another container engine separated from the first container engine, among the one or more container engines, and
an arrangement manager that is executed in a management server coupled to the one or more servers, wherein
the arrangement manger
detects a failure in the application by monitoring the first container,
transmits, in response to detection of the failure, an image creation command for imaging the first container for the application in which the failure has occurred, to the first container engine such that the container image is created by the first container engine in response to the image creation command,
receives a notification from a container registry having registered therein the container image outputted from the first server, and
transmits, in response to the notification, a command for inputting the container image, to the second container engine such that the container image is inputted from the container registry to the second server by the second container engine, in response to the input command.

2. The application arrangement system according to claim 1, wherein
the volume ID is a global ID in the storage system, and
the volume to be associated with the target second container is any one of one or more second volumes which are one or more secondary volumes for which the first volume is a primary volume.

3. The application arrangement system according to claim 2, wherein
the volume ID is an NAA (name address authority).

4. The application arrangement system according to claim 2, wherein
the first volume exists in a first storage device of the storage system,
the second volumes exist in a second storage device of the storage system,
the first volume driver performs virtual storage setting of setting the first volume and any of the one or more second volumes to be one virtual storage, and
the volume to be associated with the target second container is the second volume that is associated, as a result of the virtual storage setting, with a volume ID identical to the volume ID of the first volume.

5. The application arrangement system according to claim 2, wherein
the first volume driver embeds, in the container image, volume data information acquired from the storage system with respect to data stored in the first volume and the volume ID of the first volume, and
the second volume driver searches, in the storage system, for the volume to be associated with the target second container, by using the volume ID and the volume data information embedded in the inputted container image.

6. The application arrangement system according to claim 5, wherein
the volume to be associated with the target second container is, among the one or more second volumes:
(a) a second volume associated with volume data information that matches the volume data information embedded in the container image, and that indicates presence of a difference; or
(b) a second volume associated with volume data information that matches the volume data information embedded in the container image, and that indicates absence of a difference while a volume ID of a primary volume corresponding to the second volume matches the volume ID embedded in the container image.

7. The application arrangement system according to claim 5, wherein
(x1) and (x2) described below are sequentially performed one or more times, a volume driver in a first (x1) is the first volume driver or another volume driver separated therefrom, and a volume driver in a second or later (x1) is a volume driver in a last (x2):
(x1) the volume driver embeds, in a container image of the container, volume data information which is information acquired from the storage system with respect to data stored in a volume associated with the container, and the volume ID of the volume; and
(x2) the volume driver searches, in the storage system, for a volume to be associated with a container in a server having the volume driver, with use of the volume ID and the volume data information embedded, in (x1), in the container image inputted to the server.

8. The application arrangement system according to claim 5, wherein
(y1) and (y2) described below are performed, and a volume driver in (y1) is the first volume driver, and any one of volume drivers in (y2) is the second volume driver:
(y1) the volume driver embeds, in a container image of the container, volume data information which is information acquired from the storage system with respect to data stored in the volume associated with the container, and the volume ID of the volume; and (y2) each of volume drivers related to two or more secondary volumes searches, in the storage system, for a volume to be associated with a container in a server having the volume driver, by using the volume ID and the volume data information embedded, in (y1), in the container image inputted to the server.

9. The application arrangement system according to claim 8, wherein in (y2), when two or more volumes are found, each of the volume drivers selects, as a volume to be associated with a container in the server having the volume driver, any one, among the two or more found volumes, that exists in a storage device closest to the server, among storage devices coupled to the server, on the basis of a distance between the server and the storage device.

10. The application arrangement system according to claim 1, wherein the volume data information is a hash value of difference data stored in the first volume, the first volume is an N-th generation snapshot volume of an original volume (N is a natural number), and the difference data stored in the first volume is a difference from the original volume.

11. An application arrangement method comprising:

embedding, by a first volume driver, a volume ID of a first volume in a container image created by imaging of a first container, when the first volume is associated with a first container executing an application on a first container engine, the first container engine being a container engine in a first server, the first volume being provided from a storage system including one or more storage devices and being used in execution of the application, and the volume ID being an ID of the volume and being according to information acquired from the storage system with respect to the volume; and searching, by a second volume driver, in the storage system, for a volume associated with a target second container with use of the volume ID embedded in the container image outputted from the first server and inputted to the second server, wherein the second server is the first server or another server separated from the first server, among one or more servers, the first volume driver is a volume driver in the first server among one or more volume drivers, the second volume driver is a volume driver in the second server among the one or more volume drivers, and is the first volume driver or another volume driver separated from the first volume driver, each of the one or more second containers executes the application on the second container engine, and the second container engine is the first container engine or another container engine separated from the first container engine, among one or more container engines, wherein an arrangement manager that is executed in a management server coupled to the one or more servers, detects a failure in the application by monitoring the first container, transmits, in response to detection of the failure, an image creation command for imaging the first container for the application in which the failure has occurred, to the first container engine such that the container image is created by the first container engine in response to the image creation command, receives a notification from a container registry having registered therein the container image outputted from the first server, and transmits, in response to the notification, a command for inputting the container image, to the second container engine such that the container image is inputted from the container registry to the second server by the second container engine, in response to the input command.

12. A non-transitory computer readable storage medium with an executable program stored thereon, wherein the program instructs a computer that executes a container engine:

to embed a volume ID of a volume in a container image created by imaging of a container, when the volume is associated with a container executing an application on the container engine, the container engine being in the computer, the volume being provided from a storage system including one or more storage devices and being used in execution of the application, and the volume ID being an ID of the volume and being according to information acquired from the storage system with respect to the volume; and to, when the container image is inputted to the computer, search, in the storage system, for a volume to be associated with the container of the computer with use of the volume ID embedded in the inputted container image, and wherein the program further instructs the computer to execute an arrangement manager that is executed in a management server coupled to one or more servers, detects a failure in the application by monitoring a first container, transmits, in response to detection of the failure, an image creation command for imaging the first container for the application in which the failure has occurred, to a first container engine such that the container image is created by the first container engine in response to the image creation command, receives a notification from a container registry having registered therein the container image outputted from a first server, and transmits, in response to the notification, a command for inputting the container image, to second container engine such that the container image is inputted from the container registry to a second server by the second container engine, in response to the input command.

* * * * *